US007145836B1

(12) United States Patent
Christoff et al.

(10) Patent No.: US 7,145,836 B1
(45) Date of Patent: Dec. 5, 2006

(54) UNDERWATER ACOUSTIC GENERATOR USING PULSE ENGINE AND GAS DISPERSER

(75) Inventors: William J. Christoff, Thousand Oaks, CA (US); James A. Nestlerode, Calabasas, CA (US); James G. Johanson, Agoura, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 06/835,665

(22) Filed: Mar. 3, 1986

Related U.S. Application Data

(63) Continuation-in-part of application No. 06/623,282, filed on Apr. 13, 1984, now abandoned, which is a continuation-in-part of application No. 06/529,256, filed on Sep. 6, 1983, now abandoned.

(51) Int. Cl.
*G10K 9/10* (2006.01)
(52) U.S. Cl. .................................................. 367/142
(58) Field of Classification Search ................ 181/101, 181/113, 116, 118, 120, 141, 142, 143, 151, 181/401, 402; 367/1, 2, 3, 4, 13, 140, 141, 367/142, 143, 145, 151; 60/1
See application file for complete search history.

(56) References Cited

U.S. PATENT DOCUMENTS

| 3,679,021 A | * | 7/1972 | Goldberg ..................... 181/120 |
| 3,701,319 A | * | 10/1972 | Axelson et al. ................ 181/5 |
| 3,903,988 A | * | 9/1975 | Hermsen et al. ............ 181/142 |
| 4,258,546 A | * | 3/1981 | Stratton ....................... 60/259 |
| 4,353,431 A | * | 10/1982 | Kirby ......................... 181/120 |

* cited by examiner

Primary Examiner—Dan Pihulic

(57) ABSTRACT

A high-pressure, moving-piston pulse engine (modified HIPPE) 10 is used to produce one or a series of pulses of acoustic energy in a marine environment for acoustic communication, detection, classification or jamming. The HIPPE engine 10 is modified by removing its nozzle and replacing it with a pipe 58 which is fastened to the exit of the combustion chamber 56. A gas disperser 60 is affixed to the engine 10 or pipe 58 so that a portion of the disperser 60 extends inside of the pipe 58 the inner surface of which is spaced from the outer surface of the disperser 60 so that an annular void is formed between the pipe 58 and the disperser, through which void the combustion gases can be vented. The axial course of the gases is changed by disperser 60 to a controlled course with velocity vectors transverse to the pipe axis. The engine 10 is placed in a body of water 14 at depth or near the surface and operated either manually or automatically. The pulses can conform to a pulse code for transmitting a pulse-coded message from a ship 16 to a submarine, for example.

13 Claims, 5 Drawing Sheets

UNDERWATER ACOUSTIC GENERATOR USING PULSE ENGINE AND GAS DISPERSER

CROSS-REFERENCE TO RELATED APPLICATION

This application is a Continuation-In-Part of application Ser. No. 06/623,282, filed Apr. 13, 1984 now abandoned which was a Continuation-in-Part of Ser. No. 06/529,256, filed Sep. 6, 1983, and abandoned on Aug. 16, 1984.

BACKGROUND OF THE INVENTION

1. Field of the Invention

This invention relates to underwater acoustic sources and especially to an underwater acoustic source using a moving piston, pulse engine as an acoustic generator.

2. Description of the Prior Art

Acoustic systems have long been used for communication with submarines and for sonar detection of submarines. It is difficult, if not impossible, to establish radio-wave communication with submerged vessels since penetration of sea water by electromagnetic waves is poor. Thus, acoustic systems offer the best means of communication with a submerged vessel. However, submarines today have worldwide ranges and communication may have to be effected over vast distances. Similarly, shore installations may desire to monitor the positions of submarines thousands of miles distant from the location of the shore installation. Acoustic generators producing high values of acoustic power (i.e., pressure) are required for such classification and monitoring applications. In addition it might sometimes be desired in military applications to use acoustic signals to "jam" communications between enemy vessels or to interfere with their sonar detection attempts.

Electromagnetic and piezoelectric transducers, for example, are presently available for this work, but must be used in directive arrays to obtain sufficient power for long-distance applications. This poses serious installation and durability problems since the transducers must be installed in the ocean, in a specific orientation and with precise timing and repeatability of the acoustic pulses.

SUMMARY OF THE INVENTION

The objects and advantages of the present invention are achieved by the use of a high-pressure, moving-piston, pulse engine as an acoustic source. A specific example of a suitable engine is the HIPPE (High-Pressure Pulse Engine) designed for motive use in space vehicles by the Rockwell International Corporation, Rocketdyne Division, Canoga Park, Calif.

The HIPPE engine is described in U.S. Pat. No. 4,258, 546, issued Mar. 31, 1981, to Harold S. Stratton and is incorporated herein by reference. The engine is placed in an underwater environment suspended between sea floor and sea surface or at the surface of the sea with its discharge port submerged beneath the surface. The engine is modified by removing its nozzle and replacing it with a pipe which is fastened to the combustion chamber of the engine. A disperser is fastened to the rear of the pipe in such a manner that at least a portion of the disperser extends into the pipe leaving an annular space between the disperser surface and the inside wall of the pipe. The combustion chamber and a proximate volume of the pipe are injected with a pressurized gas before firing the engine to provide a water-free volume in which controlled combustion can occur. The gaseous pulse discharge of the engine occurs transversely to the longitudinal axis of the engine without any propulsive effect. The gas discharge tube is acoustically tuned by varying the structural dimensions of the pipe exit by either fixed or adjustable devices.

OBJECTS OF THE INVENTION

An object of the invention is to achieve improved communication with and improved detection of submerged vessels at long distances.

Another object is to provide an improved acoustic generator for underwater acoustic systems.

A further object is to provide an acoustic generator for underwater acoustic systems, which produces sufficient power output to be used singly instead of in arrays.

Yet another object is to provide an underwater acoustic generator which is small enough to be retrieved after each use.

A further object is to provide a controllable, variable, repeatable, high-energy source for underwater generators.

Other objects, advantages and novel features of the present invention will become apparent from the following detailed description of the invention when considered in conjunction with the accompanying drawing.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figure 1:
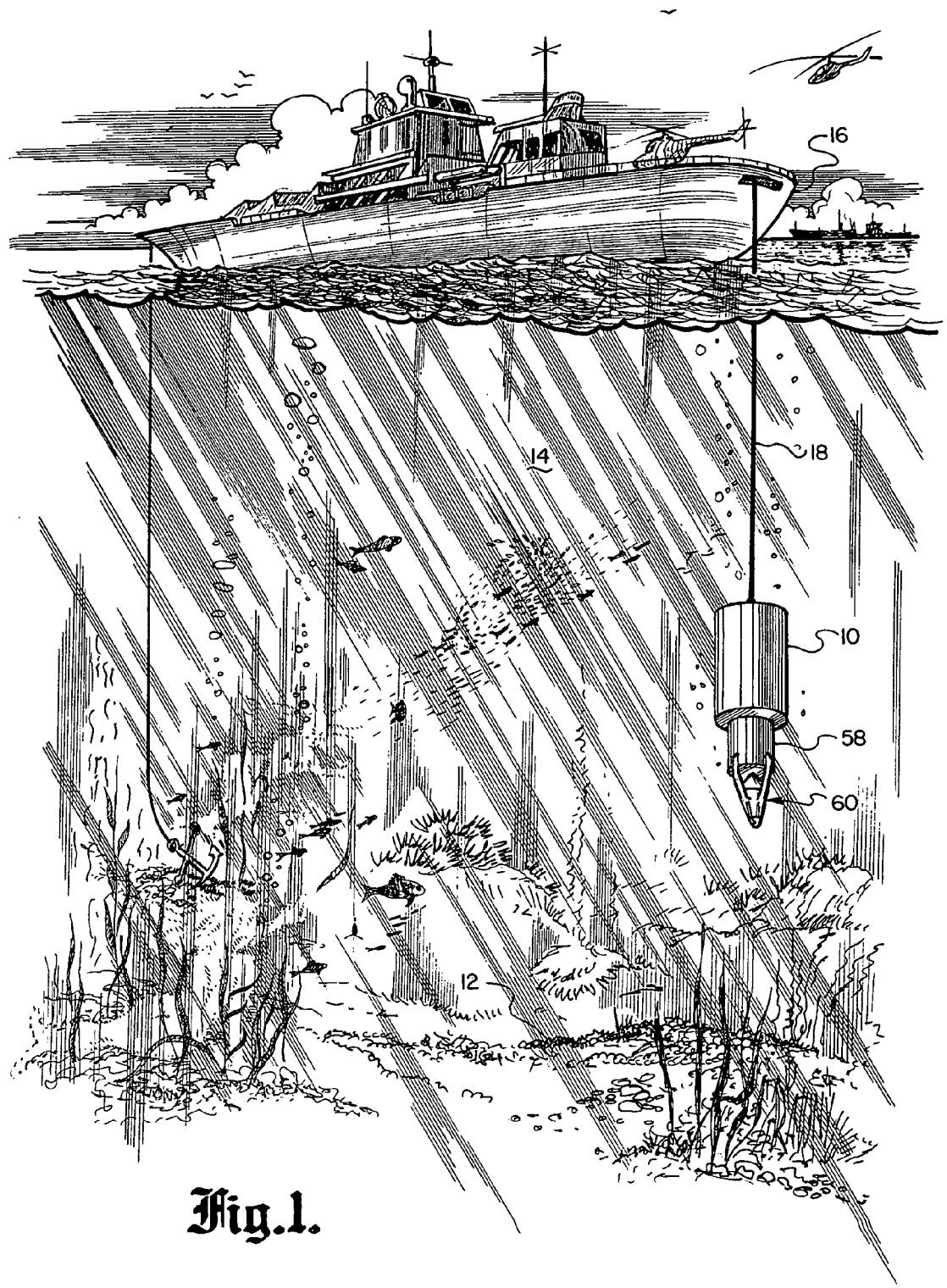
FIG. 1 is a schematic illustration of the use of a moving-piston engine in association with a surface vessel.

FIG. 1 shows an engine 10, according to the present invention, which has been placed at a depth in the ocean 14 (depth determined by application). The engine 10 may be deployed into the water from a ship or an aircraft, for example, in which case it would be a self-contained unit with fuel and oxidizer containers, etc., being included with the engine itself. In relatively shallow bodies of water (e.g. harbors), the engine may be tethered to a ship which is stationary or moving, with the propellant containers (fuel and oxidizer) on the ship and propellant feed lines to the engine which is underwater.

The HIPPE engine previously mentioned, when modified, is very suitable for use as an underwater acoustic generator. It produces pulses of pressure, each approximately a 3000 psi, 10 millisecond pulse, although later HIPPE engines have been designed for output pressures up to about 10,000 psi and pulse durations as low as 3 msecs. The underwater frequency band of each pulse is approximately 25 Hz to 250

Hz, a band of frequencies which is excellent for long-range underwater propagation. The firing rate is controllable and can be made as rapid as 60 pulses per second, or as slow as desired (e.g., a single pulse with as long a time duration as desired before the engine is fired again). Note also, that the output pulse is a repeatable pulse.

Figure 2:
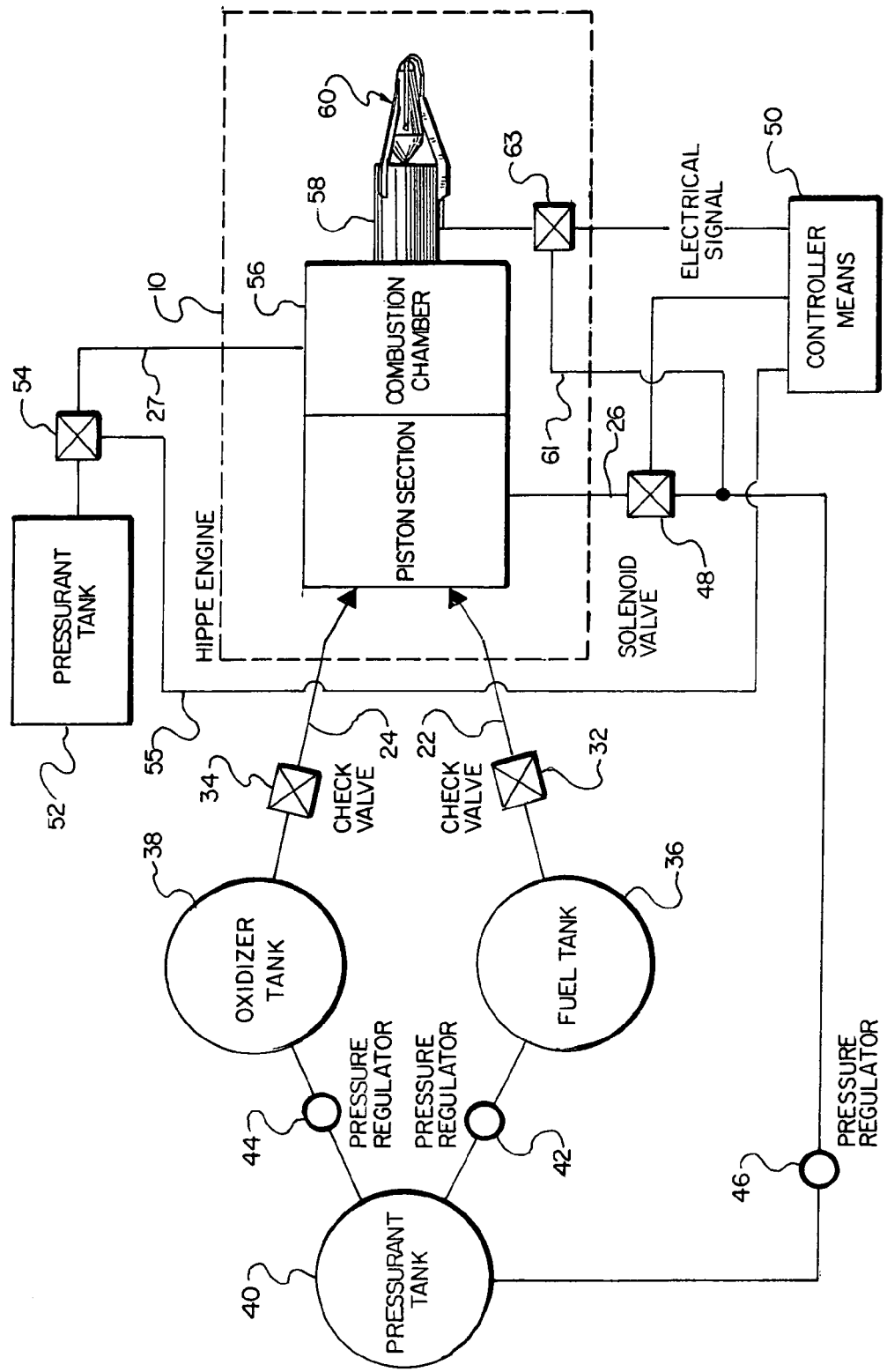
FIG. 2 is a block diagram of a modified HIPPE engine and its associated components suitable for underwater use as a pulse acoustic source.

FIG. 2 shows a modified HIPPE engine 10 and its associated components, which components may be in the water between the ocean floor 12 and the ship 16 or on the ship itself. The associated components are connected to the engine 10 by fuel, oxidizer and pressurant lines 22, 24, 26, 27. The engine 10 operates, preferably, on a hypergolic fuel and oxidizer charge, the fuel and oxidizer being fed to the charging chambers of the piston section of the engine 10 by self-opening of the check valves 32 and 34 from the fuel and oxidizer tanks 36 and 38. A pressurant tank 40 feeds pressurized gas, preferably an inert gas such as nitrogen or helium, to the fuel and oxidizer tanks 36 and 38 through a pair of pressure regulators 42 and 44 so that the fuel and oxidizer liquids are pressurized at about 300 psi pressure above ambient.

The pressurant gas is also fed to the piston of the HIPPE engine through a pressure regulator 46 under the control of a solenoid valve 48 which can be opened upon application to the valve 48 of a suitable electrical signal from a controller means 50.

Pressurant gas is also fed to the combustion chamber 56 from a pressurant tank 52 through a valve 54 connected by line 55 from controller means 50.

Figure 3:
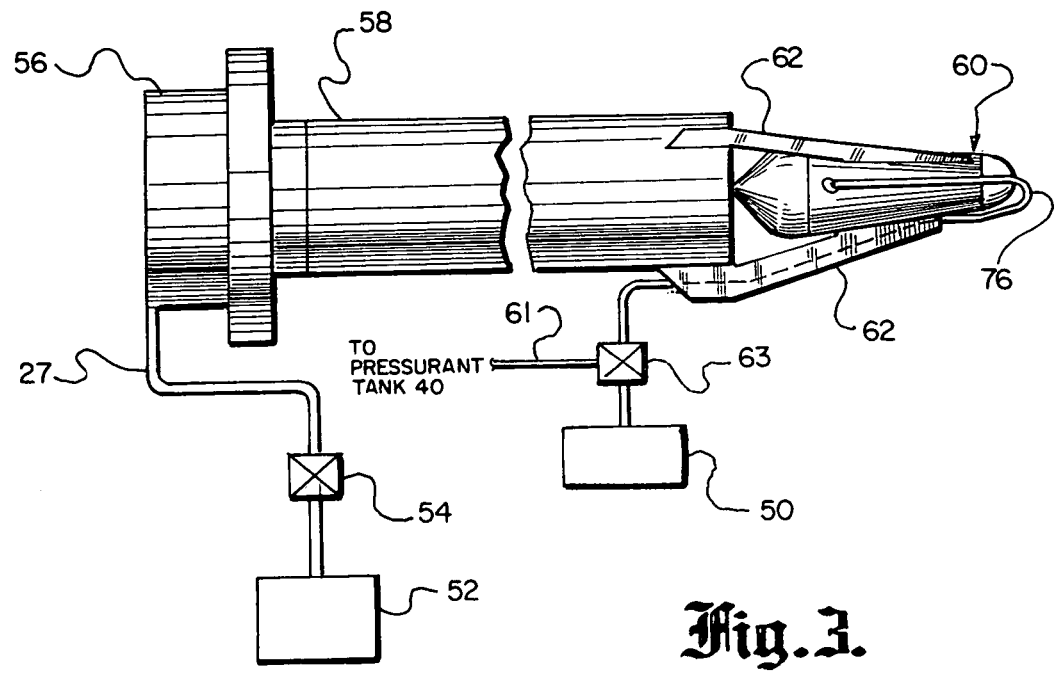
FIG. 3 is a schematic side view of the pipe and disperser assembly which replaces the nozzle of the modified HIPPE engine.

The HIPPE engine (see FIG. 3) is modified for sonic use by removing its nozzle and replacing the nozzle with a pipe 58 the inside diameter of which is the same as the inside diameter of the combustion chamber 56. Pressurant gas is fed to a disperser 60 attached to the end of the pipe 58 through line 61 and valve 63. The disperser 60 is attached to the end of the pipe 58 by any suitable means, such as a plurality of members 62. The members 62 may be bolted to the disperser 60 and welded around the outside of the pipe 58. Shapes, other than as shown, may be used for the members 62; however, they should preferably be aerodynamically faired and designed to provide minimal drag. Members 62 support the disperser 60 centrally on the axis of pipe 58.

Figure 6:
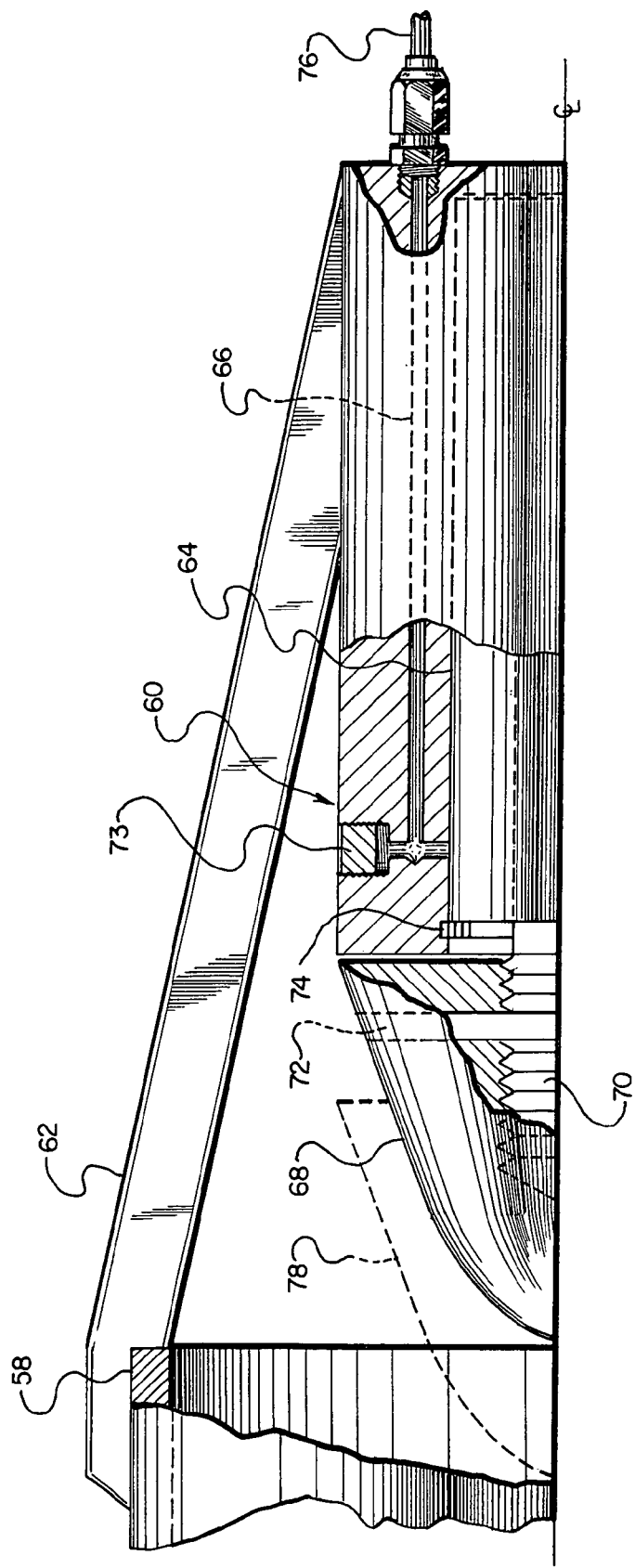
FIG. 6 is a cross-sectional view of half of the disperser assembly taken along the center line.

As shown in FIG. 6, the disperser 60 houses a single or double acting axial piston subassembly 64 actuated remotely by pneumatic, hydraulic or electric means 66. In the specific embodiment shown in FIG. 6 a disperser nose cone 68 is shown mounted to the piston subassembly 64 by a threaded attachment 70 which includes a piston rod roll pin 72, with the piston subassembly retained in the disperser by a snap ring 74. Actuating fluid is introduced to the disperser by fluid line 76 and directed by conduit plug 73.

When actuated, the piston subassembly 64 displaces the nose cone 68 a controlled distance toward pipe 58 as shown by phantom line 78. This displacement results in a predetermined, selected change in the area of the annular space between the nose cone 68 and the pipe 58. The lateral or transverse forces produced cancel each other out since they act equally in a 360° circumference around the axis of the engine. No axial propulsive force is produced and the sonic pulse is propagated equally in all directions around the axis of the pipe 58.

In operation, the check valves 32 and 34 (reference FIG. 2) are opened to allow the charging chambers of the piston of the modified HIPPE engine to be filled with fuel and oxidizer. An electrical signal from the controller means 50 is sent to the solenoid valve 48 allowing gas under pressure to be applied to lift the propellant seals in the piston, permitting propellants to flow into the combustion chamber and self-ignite (combust) after gas has been injected into the chamber 56 to free it of water. Combustion raises the chamber pressure which moves the piston backward and the backward movement injects propellants into the combustion chamber at increasing pressure. The combustion chamber 56 pressure rises rapidly due to the continued injection of propellants and the restricted water exit of the water pipe. The piston is moved back rapidly, with continually increasing injection pressure resulting in increasing combustion chamber pressure, until the propellants in the engine-charging chambers are expended and, therefore, after the water is expelled from the pipe, the combustion gases exit. These combustion gases flow around the disperser 60 forming a predetermined, shaped cavity in the surrounding water. The rate and size of the cavity growth and collapse determine the acoustic energy level. The period of the subsequent oscillations of the cavity determine the acoustic spectrum. Moving the disperser 60 further into the pipe 58 affects the energy level and frequency characteristics of the cavity. Further rapid combustion is nearly in the form of an explosion, producing a pulse of high pressure and therefore an acoustic wave through the water. After combustion is completed, the piston is pushed forward by propellant tank pressure and the charging chambers then refill with oxidizer and fuel to await the next signal from the controller means 50. The latter may be operated manually as a simple manual switch means or may be an electronic unit which can be programmed to emit a series of switching signals in a coded sequence so that pulse-coded acoustic signals may be propagated by the HIPPE engine and disperser. This engine concept is unique in that it produces a very repeatable pulse which can be used in a variety of patterns, thus providing the capability for coded communication and sophisticated sonar investigations.

It is necessary before ignition to remove the water from the combustion chamber 56; otherwise, the combustion of the propellants is quenched too quickly. The water is replaced by air or other gas from the pressurant tank 52 by opening the valve 54. The water in the forward part of the pipe 58 next to the combustion chamber 56 is also replaced by gas.

Figure 4:
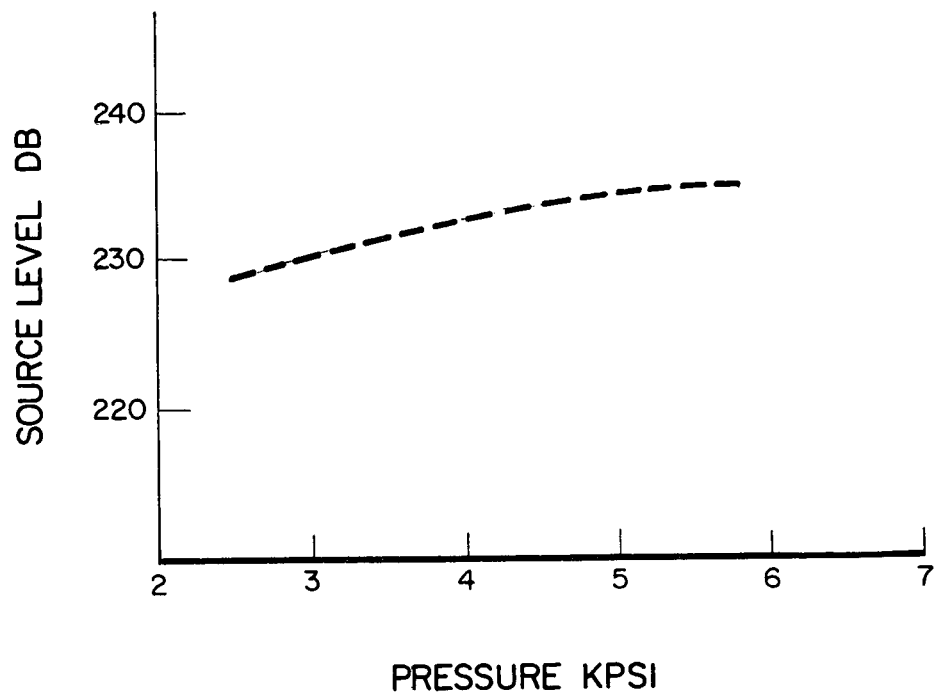
FIG. 4 is a graph showing sonic output vs pressure developed by the sonic source.

For a 3-foot pipe and an air volume of 30 cubic inches in the combustion chamber and the pipe, an output pressure of about 6 K psi can be obtained (as shown in FIG. 4) with an acoustic output level of about 235 db. With a pressure of 5 K psi, about 230 db can be obtained.

Figure 5:
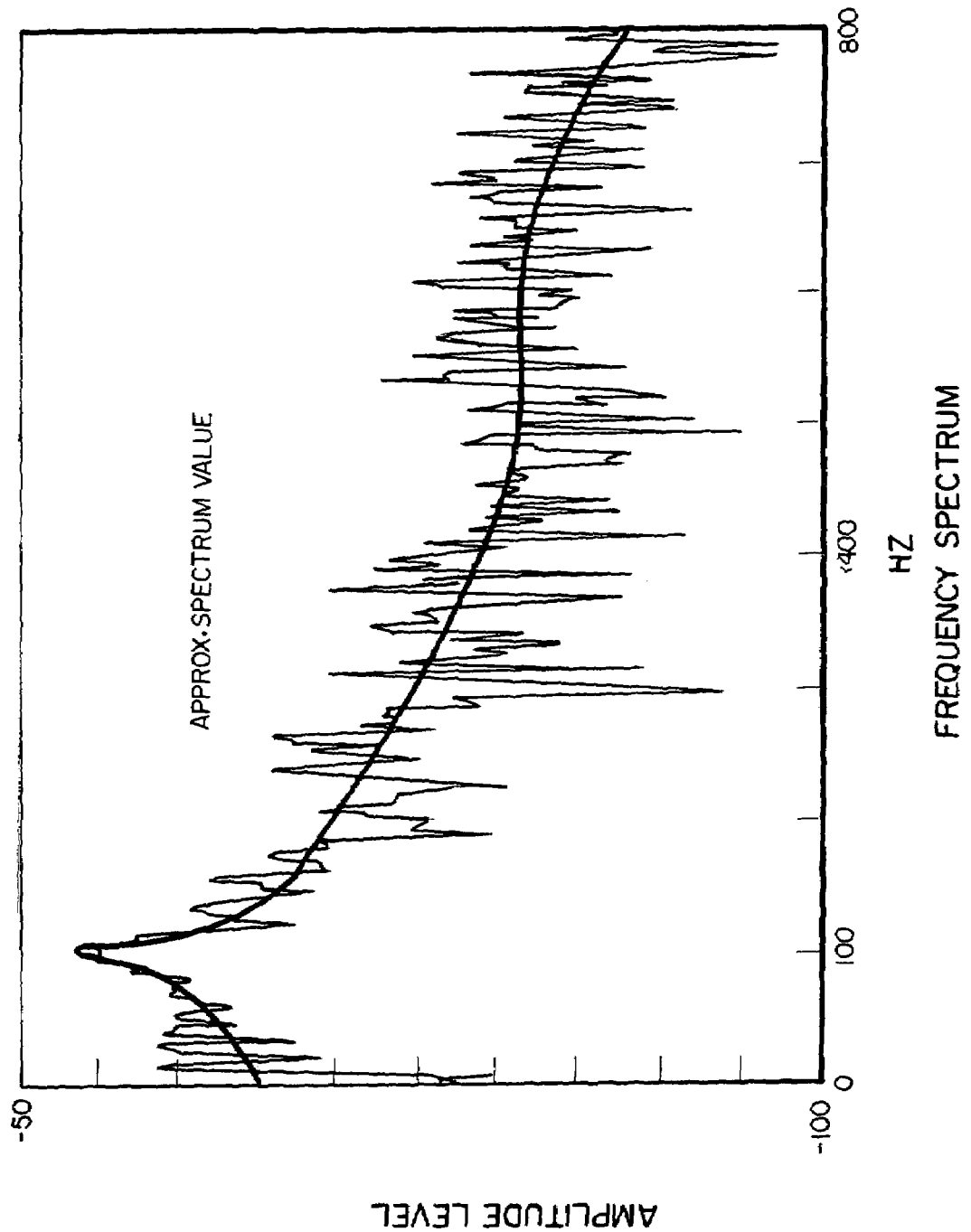
FIG. 5 is a graph illustrating the frequency spectrum of the output of the sonic source.

FIG. 5 shows the frequency spectrum of the output pulse from 0–800 Hz. It can be seen that a peak occurs at about 100 Hz and the low-frequency range from 0–100 Hz is quite high in sonic amplitude.

If jamming signals are desired, the controller means 50 may be set to provide switching signals at a rate of up to 60 per second.

A HIPPE engine typically is about 6 inches in diameter and 12 inches in length and weighs about 80 pounds. The other components without propellants may weigh up to about 100 pounds. Propellant weight is determined by the number of pulses desired. Even if a total package is dropped into the water, the package (less propellants) is still under 200 pounds. Thus, the modified HIPPE engine provides an easily portable, easily handled, high-pressure, acoustic source which generates a controllable, repeatable and variable pulse output.

Obviously, many modifications and variations of the present invention are possible in light of the above teach- It is therefore to be understood that, within the scope of the appended claims, the invention may be practiced otherwise than as specifically described.

What is claimed and desired to be secured by Letters Patent of the United States is:

1. A method of using a moving-piston, pulse engine in an aquatic environment to generate controlled, repeatable and variable acoustic energy for acoustic purposes comprising the steps of:

placing a moving-piston, pulse engine in an aquatic environment, said pulse engine being operable in a low frequency range below 800 Hz; and activating said engine so that the engine operates for a predetermined time interval, the controlled release of the combustion gases therefrom producing pulses of acoustic energy which is propagated within the aquatic environment.

2. A method as in claim 1, wherein:
    said engine operates on a regenerative piston principle such as the HIPPE.

3. A method as in claim 1, wherein:
    said engine is sequentially operated to produce a sequence of pulses.

4. A method as in claim 1, wherein:
    said pulse of energy is approximately between 3 and 10 milliseconds in duration.

5. A method as in claim 1, wherein:
    said aquatic environment is a marine environment.

6. A method as in claim 1, wherein:
    the pressure produced by the pulse is approximately between 3000 and 10,000 psi.

7. A method as in claim 2, wherein:
    said engine is sequentially operated to produce a sequence of pulses.

8. An acoustic generator for an aquatic environment comprising:

a repeatable pulse combustion engine being operable in a low frequency range below 800 Hz including a combustion chamber having an exit, a pipe having a first end affixed to said combustion chamber exit and in fluid communication with said exit, said pipe having an axially extending second end; and disperser means having an outer surface, said disperser means centrally located on the axis of the second end of said pipe, and adjacent the second end for dispersing combustion gases discharged therefrom, wherein, when said engine is pulsing, the combustion gases from said combustion chamber travel through said pipe and through a space between the outer surface of said disperser means and said second end of the pipe, so that the combustion gases are spread out as they flow around said disperser means forming a controlled cavity in the surrounding aquatic environment and a resultant acoustic wave through said environment.

9. An acoustic generator as in claim 8, wherein:

a portion of said disperser means extends inside said pipe to form an annular void between the outer surface of said disperser means and an inner surface of said pipe.

10. An acoustic generator as in claim 9, wherein:

the shape of said disperser means is divergent from a point which extends farthest inside the pipe.

11. An acoustic generator as in claim 9, including:

means for adjusting a physical parameter of said disperser means for varying the space between the outer surface of the disperser and the inner surface of the pipe.

12. An acoustic generator as in claim 9, including:

means for positioning said dispersing means so that the dispersing means can be moved in relation to the second end of said pipe.

13. An acoustic generator as in claim 9, wherein:

said engine is a HIPPE engine.

\* \* \* \* \*